United States Patent [19]

Suzuki

[11] Patent Number: 5,270,830
[45] Date of Patent: Dec. 14, 1993

[54] FACSIMILE TRANSMISSION SYSTEM

[75] Inventor: Kanji Suzuki, Kawasaki, Japan

[73] Assignee: Fujitsu Limited, Kawasaki, Japan

[21] Appl. No.: 932,736

[22] Filed: Aug. 25, 1992

Related U.S. Application Data

[63] Continuation of Ser. No. 565,674, Aug. 10, 1990, abandoned.

[30] Foreign Application Priority Data

Aug. 10, 1989 [JP] Japan .................. 1-207145

[51] Int. Cl.⁵ .............................. H04N 1/00
[52] U.S. Cl. ................... 358/400; 358/406; 358/411; 358/437
[58] Field of Search ........... 358/400, 401, 403, 404, 358/405, 406, 407, 434, 438, 441, 443, 444, 488, 496, 436, 437, 442; 379/100

[56] References Cited

U.S. PATENT DOCUMENTS 4,598,323  7/1986  Honjo et al. ............ 358/496

FOREIGN PATENT DOCUMENTS

| 0028603 | 2/1980 | Japan | 358/438 |
| 55-93371A | 7/1980 | Japan | 358/404 |
| 58-168377A | 10/1983 | Japan | 358/441 |
| 0124195 | 7/1985 | Japan | 358/441 |
| 60-236565A | 11/1985 | Japan | 358/441 |
| 0194632 | 8/1989 | Japan | 358/441 |

Primary Examiner—Edward L. Coles, Sr.
Assistant Examiner—Jerome Grant, II
Attorney, Agent, or Firm—Staas & Halsey

[57] ABSTRACT

A facsimile transmission system is applied a facsimile machine which has a store-and-forward mode in which image data related to one or a plurality of document pages are read by a reading part and temporarily stored in a memory part and thereafter transmitted to a destination by a transmitting part at an arbitrary time. The facsimile transmission system includes a detecting part for detecting a certain state where an empty memory area of the memory part available for storing the image data of the document page reaches a predetermined area, an alarm output part for outputting an alarm when the detecting part detects the certain state, an instructing part for outputting an instruction which instructs a chain transmission mode in which one or a plurality of document pages are read by the reading part and transmitted by the transmitting part immediately after transmission of the one or plurality of document pages stored in the memory part without interruption, and a control part for controlling a mode of the facsimile machine to the chain transmission mode in response to the instruction when the alarm is output from the alarm output part.

12 Claims, 4 Drawing Sheets

FACSIMILE TRANSMISSION SYSTEM

This application is a continuation of application Ser. No. 07/565,674, filed Aug. 10, 1990, now abandoned.

BACKGROUND OF THE INVENTION

The present invention generally relates to facsimile transmission systems, and more particularly to a facsimile transmission system which uses an image memory of a facsimile machine.

Owing to the popular use of facsimile machines, there are now variety of usages of the facsimile machines. As a result, there are demands to increase the functions of the facsimile machines.

For example, there are demands to make it possible for the operator to take home a document which is to be transmitted and to make it possible to program a facsimile transmission so that the operator need not attend the facsimile machine when actually making the facsimile transmission. In order to satisfy such demands, there is a proposed facsimile machine which is provided with an image memory for storing image data of the document which is to be transmitted.

In the facsimile machine which is provided with the image memory, the image data of the document which is to be transmitted is temporarily stored in the image memory and the stored image data can be automatically transmitted at an arbitrary time. After the image data of the document is stored in the image memory, the document no longer needs to be set on the facsimile machine and the operator can freely take home the document. In this specification, a mode of the facsimile machine in which the image data of the document is temporarily stored in the image memory and transmitted at an arbitrary time will hereinafter be referred to as a store-and-forward mode.

Of course, it is desirable that the memory capacity of the image memory provided in the facsimile machine is as large as possible. However, an upper limit of the memory capacity is determined by a maximum permissible cost of the image memory for use on the facsimile machine.

In the store-and-forward mode of the facsimile machine, the image memory may run out of available empty memory area while the document is being read. In this case, the image data up to the previous page is regarded as the effective data and an error information is output. This error information indicates that the image data related to the present page which is being read cannot be stored in the image memory. In this case, the present and subsequent pages are set on the facsimile machine for transmission after the pages stored in the image memory are transmitted.

However, the conventional facsimile transmission system detects an error and discontinues the transmission process when the image memory runs out of available empty memory area while the document is reading the present page of the document. As a result, there are problems in that the present and subsequent pages of the document must be set again on the facsimile machine after the transmission of the stored pages up to the previous page of the document is completed, and the operator on the transmitting station must carry out the troublesome operation of setting again the present and subsequent pages of the document on the facsimile machine. On the other hand, at the receiving station, pages of an unrelated document may be received between the previous page and present pages of the document because the previous page and the present page are transmitted from the transmitting station at different times. For this reason, there is a problem in that a disorder of the pages of the received document may occur at the receiving station when the above described error occurs at the transmitting station.

SUMMARY OF THE INVENTION

Accordingly, it is a general object of the present invention to provide a novel and useful facsimile transmission system in which the problems described above are eliminated.

Another and more specific object of the present invention is to provide a facsimile transmission system for a facsimile machine which has a store-and-forward mode in which image data related to one or a plurality of document pages are read by reading means and temporarily stored in memory means and thereafter transmitted to a destination by transmitting means at an arbitrary time, comprising detecting means for detecting a certain state where an empty memory area of the memory means available for storing the image data of the one or a plurality of document pages reaches a predetermined area, alarm output means coupled to the detecting means for outputting an alarm when the detecting means detects the certain state, instructing means for outputting an instruction which instructs a chain transmission mode in which one or a plurality of document pages are read by the reading means and transmitted by the transmitting means immediately after transmission of the one or plurality of document pages stored in the memory means without interruption, and control means coupled to the alarm output means and the instructing means for controlling a mode of the facsimile machine to the chain transmission mode in response to the instruction when the alarm is output from the alarm output means. According to the facsimile transmission system of the present invention, it is possible to improve the performance of the facsimile machine in the store-and-forward mode even when the memory means has a relatively small memory capacity, without considerable increase in cost.

Still another object of the present invention is to provide a facsimile transmission system for a facsimile machine which has a store-and-forward mode in which image data related to one or a plurality of document pages are read by reading means and temporarily stored in memory means and thereafter transmitted to a destination by transmitting means at an arbitrary time, comprising detecting means for detecting a certain state where an empty memory area of the memory means available for storing the image data of the document page reaches a predetermined area, sensor means for detecting a document page set on the reading means, instructing means coupled to the sensor means for outputting an instruction which instructs a chain transmission mode in which one or a plurality of document pages are read by the reading means and transmitted by the transmitting means immediately after transmission of the one or plurality of document pages stored in the memory means without interruption, where the instructing means automatically outputs the instruction when the sensor means detects the document page set on the reading means after the one or plurality of document pages stored in the memory means is transmitted by the transmitting means in the store-and-forward mode, and control means coupled to the instructing means for controlling a mode of the facsimile machine to the chain transmission mode in response to the instruction in the store-and-forward mode of the facsimile machine. According to the facsimile machine of the present invention, it is possible to eliminate the need for the operator to set the unread document pages again on the reading means because the chain transmission mode is set automatically.

Other objects and further features of the present invention will be apparent from the following detailed description when read in conjunction with the accompanying drawings.

DESCRIPTION OF THE PREFERRED EMBODIMENTS

First, a description will be given of an operating principle of a facsimile transmission system according to the present invention, by referring to FIG. 1.

Figure 1:
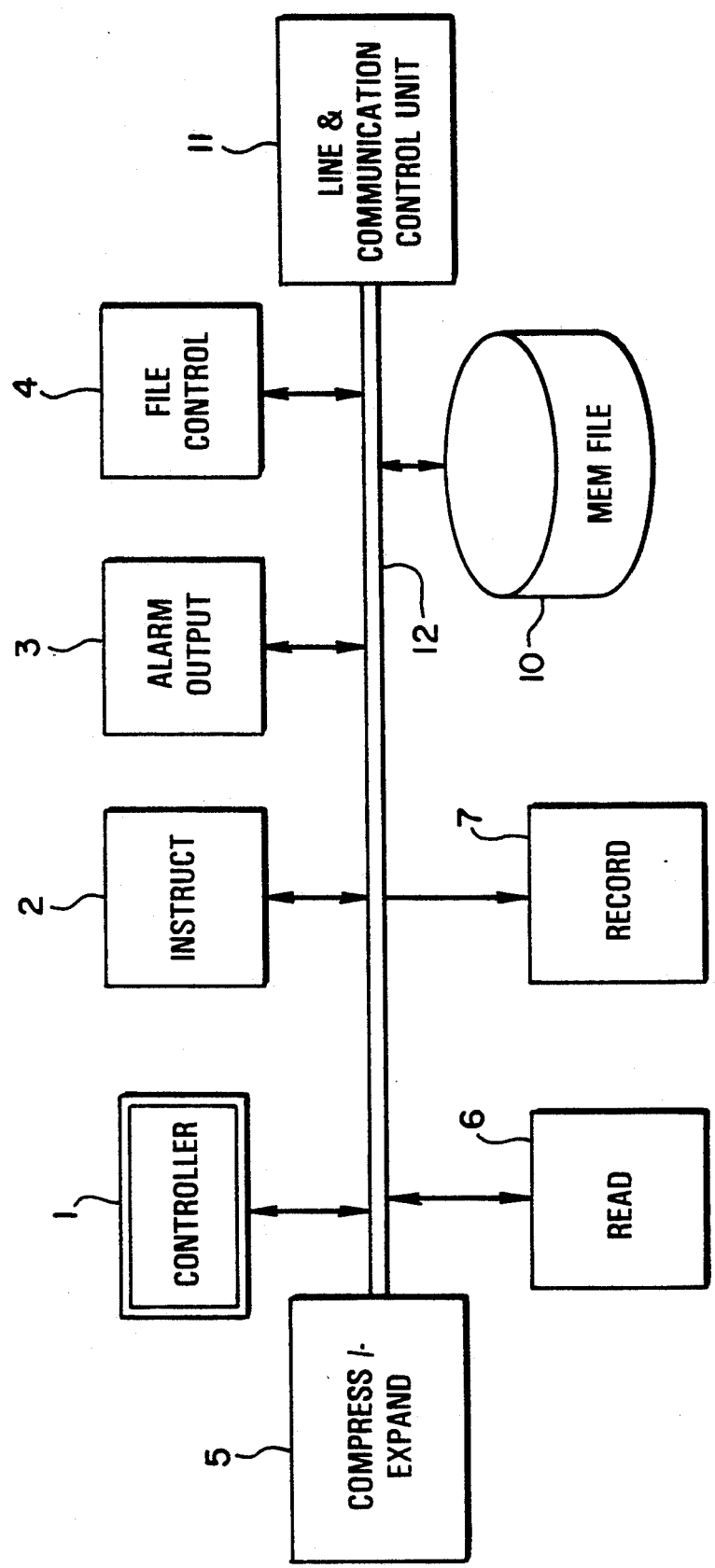
FIG. 1 is a system block diagram for explaining an operating principle of a facsimile transmission system according to the present invention.

A facsimile machine shown in FIG. 1 generally includes a controller 1, a chain transmission instructing part 2, an alarm output part 3, a file control part 4, a compression/expansion part 5, a reading part 6, a recording part 7, a memory file 10 and a line and communication control unit 11 which are coupled via a bus 12.

The controller 1, the file control part 4, the compression/expansion part 5, the reading part 6, the recording part 7, the memory file 10, the line and communication control unit 11 and the bus 12 are used to carry out a facsimile transmission in a store-and-forward mode similarly to a conventional facsimile machine which is provided with the image memory.

The file control part 4 supervises the memory file 10 in the store-and-forward mode, and the alarm output part 3 outputs an alarm when a document data memory area of the memory file 10 becomes full while reading the document. The alarm may be displayed and/or generated as an alarm sound. When the operator of the facsimile machine instructs a chain transmission from the chain transmission instructing part 2 after the alarm is output, this instruction is detected by the controller 1. In this case where the above instruction is detected, the controller 1 starts transmission of the document pages stored in the memory file 10, and after all of the stored document pages are transmitted, automatically starts transmission of the remaining document pages which could not be stored in the memory file 10 in a continuous manner, without discontinuing the transmission process. Therefore, at the receiving station, all of the document pages are received continuously in the correct order, and no unrelated document pages will be received between the last document page stored in the memory file 10 and the first document page which could not be stored in the memory file 10.

Figure 2:
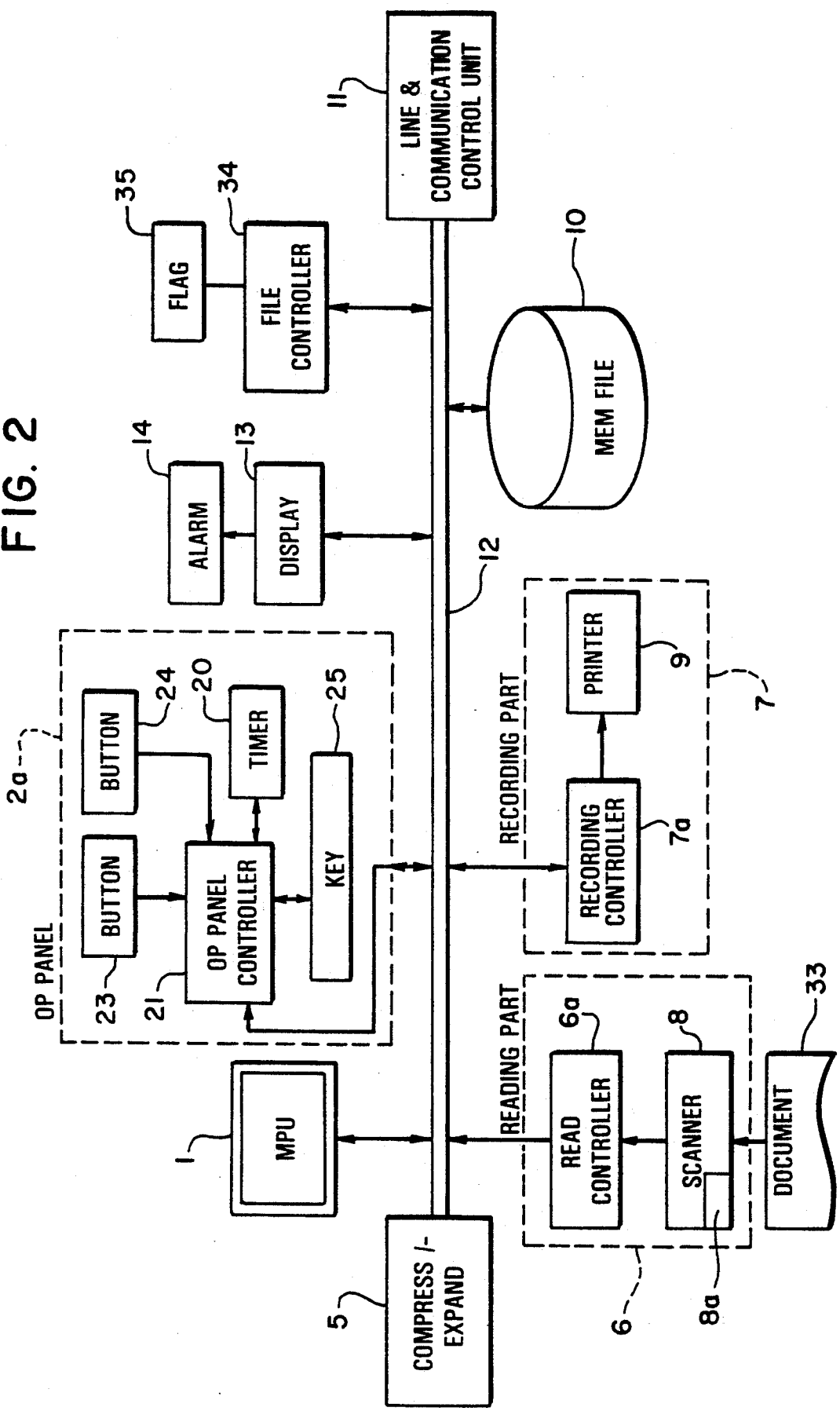
FIG. 2 is a system block diagram showing an embodiment of a facsimile transmission system according to the present invention.

Next, a description will be given of an embodiment of the facsimile transmission system according to the present invention, by referring to FIG. 2. In FIG. 2, those parts which are the same as those corresponding parts in FIG. 1 are designated by the same reference numerals, and a description thereof will be omitted.

In FIG. 2, the controller 1 is made of a microprocessor unit (MPU). An operation panel 2a is used as the chain transmission instructing part 2. The operation (OP) panel 2a includes a timer 20, an operation panel controller 21, a start button 23, a memory input button 24 and a dialing destination designation key 25. The start button 23 instructs a read operation in which the document is read by the reading part 6 and the image data related to the read document is stored in the memory file 10. On the other hand, the memory input button 24 instructs the store-and-forward mode. The alarm output part 3 includes a display 13 and an alarm generator 14. The file control part 4 includes a file controller 34 and a flag 35. For example, the flag 35 is made of a register which stores information indicating whether or not the chain transmission is requested. The reading part 6 includes a scanner 8 and a read controller 6a. The scanner 8 scans each page of a document 33 which is placed on a document reading tray (not shown). The recording part 7 includes a printer 9 and a printer or recording controller 7a.

A description will now be given of the operation of storing the pages of the document 33 in the memory file 10.

First, the operator sets the document 33 which is to be transmitted on the document reading tray and pushes the memory input button 24 of the operation panel 2a. An instruction signal which is generated by pushing the memory input button 24 is supplied to the operation panel controller 21. When the MPU 1 detects this instruction signal, the MPU 1 sets the mode of the facsimile machine to the store-and-forward mode so as to prepare inputting the image data of the document 33 into the memory file 10.

Second, when the start button 23 is pushed after manipulating the dialing destination designation key 25, signals from the dialing destination designation key 25 and the start button 23 are supplied to the operation panel controller 21. When these signals are detected by the MPU 1, the MPU 1 stores the destination information and controls the read controller 6a so that the scanner 8 starts to scan each page of the document 33. The image data read from the document 33 is stored in the memory file 10 via the read controller 6a.

In this state, the MPU 1 makes access to the file controller 34 which manages the memory file 10 by making the addresses of the data memory areas within the memory file 10 correspond to the pages of the document 33. When the read operation is carried out correctly and ends, the MPU 1 supplies the destination information and the page information to the recording controller 7a so that the destination information and the page information are included in an acceptance list which is printed by the printer 9.

The MPU 1 dials via the line and communication control unit 11 the destination telephone number which is designated from the destination designation key 25 so as to start a transmission.

The MPU 1 instructs the file controller 34 to read and transmit the image data stored in the memory file 10.

After transmission of the image data stored in the memory file 10 ends, the facsimile transmission ends.

The above described operation is basically the same as the operation of the conventional facsimile machine in the store-and-forward mode.

Next, a description will be given of the operation of the embodiment when the memory file 10 becomes full and no more image data can be stored therein.

Figure 3:
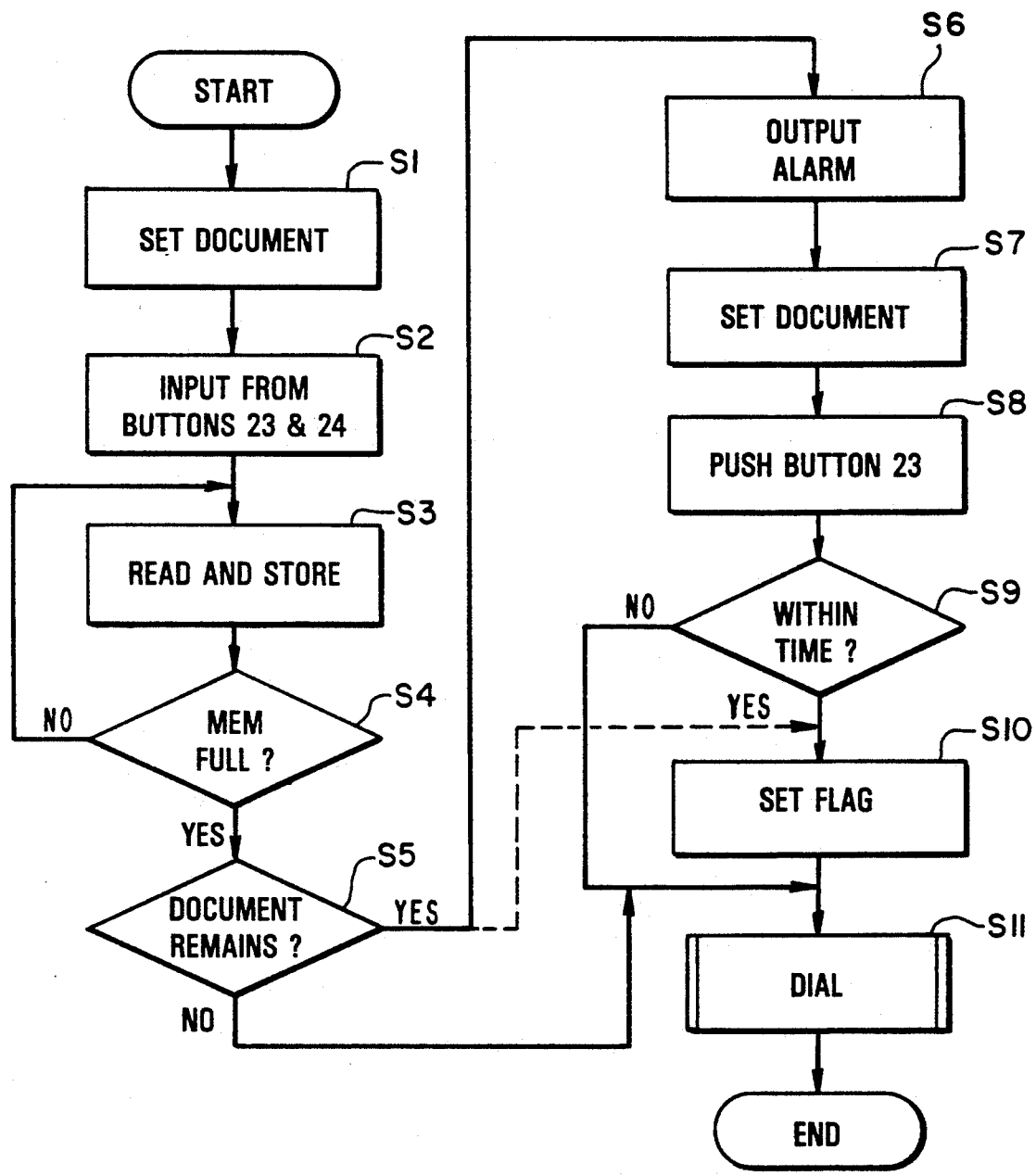
FIGS. 3 and 4 are flow charts for explaining an operation of the embodiment shown in FIG. 2.

In FIG. 3, the operator sets the document 33 on the document reading tray in a step S1, and makes the input from the memory input button 24 and the start button 23 in a step S2. The MPU 1 carries out a control in a step S3 so that the scanner 8 reads the pages of the document 33 and the image data related to the scanned pages are stored in the memory file 10. The MPU 1 judges in a step S4 to determine whether or not the memory area of the memory file 10 is full, that is, the empty memory area is zero. The process returns to the step S3 when the judgement result in the step S4 is NO.

Next, when the judgement result in the step S4 is YES, the MPU 1 judges in a step S5 whether or not pages of the document 33 still remain on the document reading tray. When the judgement result in the step S5 is YES, the MPU 1 in a step S6 judges that not all of the image data related to the page which is presently being read are stored in the memory file 10 when no end signal is detected. This end signal is received at the end of each page as in the case of the conventional facsimile machine. Hence, in this case, the MPU 1 displays an alarm message on the display 13 and/or generates an alarm sound from the alarm generator 14. In addition, the MPU 1 starts the timer 20. In this state, the present page which is only read halfway is ejected onto an eject tray (not shown) under the control of the read controller 6a. Although some image data related to the present page which is only read halfway are stored in the memory file 10, the image data related to this present page are incomplete and therefore invalidated by the file controller 34 so that the incomplete image data related to the present page will not be transmitted to the destination.

After the operator hears the alarm, the operator in a step S7 sets the all unread pages of the document 33 again on the document reading tray within a predetermined time which is preset in the timer 20. Then, the operator pushes the start button 23 in a step S8. The information which indicates that the remaining pages of the document 33 are set on the document reading tray within the predetermined time and that the start button 23 is pushed is supplied to the MPU 1 via the operation panel controller 21. Hence, in a step S9, the MPU 1 judges whether or not the remaining pages of the document 33 are set on the document reading tray within the predetermined time and the start button 23 is pushed. When the judgement result in the step S9 is YES, the MPU 1 sets the flag 35 via the file controller 34 to indicate a chain transmission mode in which the remaining pages of the document 33 are transmitted immediately after the transmission of the pages stored in the memory file 10 without interruption.

Thereafter, in a step S11, the MPU 1 dials the destination telephone number, and starts transmission of the document 33 after connecting to a line via the line and communication control unit 11. The step S11 is also carried out when the judgement result in the step S5 or S9 is NO. When the judgement result in the step S9 is NO, it is assumed that the operator does not wish to transmit the remaining pages of the document 33 in the chain transmission mode and only the stored pages of the document 33 are transmitted.

Figure 4:
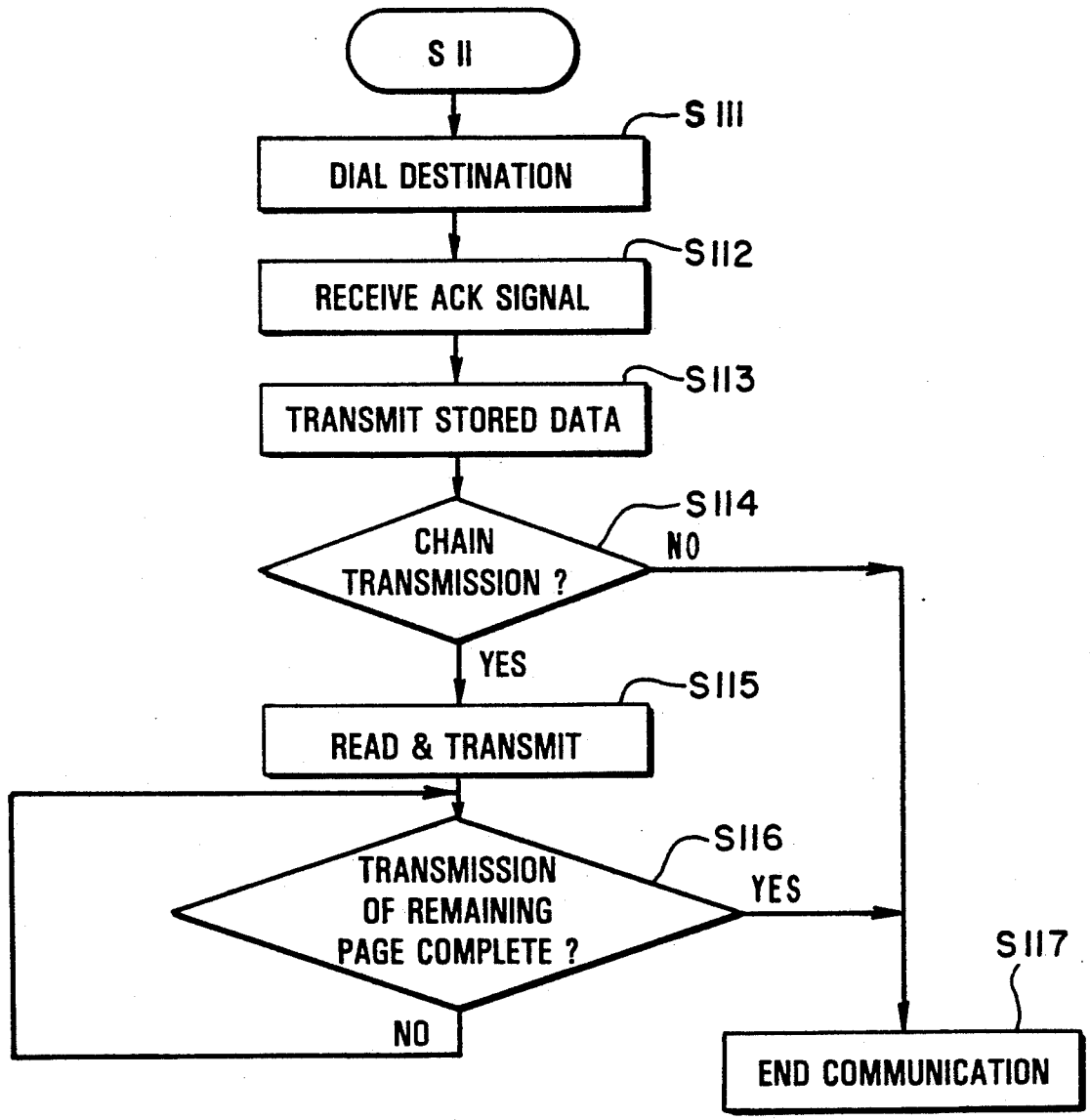

FIG. 4 shows the step S11 of the MPU 1 in more detail. In FIG. 4, a step S111 dials the destination telephone number, and a step S112 receives an acknowledge signal from the destination. A step S113 transmits all of the image data stored in the file memory 10 under the control of the file controller 34. After all of the image data are transmitted, a step S114 judges whether or not the chain transmission mode is selected based on the state of the flag 35. When the flag 35 is set and the judgement result in the step S114 is YES, a step S115 starts the reading of the remaining pages of the document 33 set on the document reading tray and the transmission of the read pages, without disconnecting the line. In other words, the transmission of the pages set again on the document reading tray are successively transmitted immediately after the pages stored in the memory file 10 without interruption.

Then, a step S116 judges whether or not the transmission of the remaining pages is completed by detecting whether or not a page of the document 33 still remains on the document reading tray. A known means can be used to detect the existence of the page placed on the document reading tray. For example, the sensor 8 is provided with a sensor 8a which detects the page of document on the document reading tray. When the sensor 8a detects a page on the document reading tray, the judgement result in the step S116 becomes NO and the process returns to the step S115. On the other hand, when the sensor 8a detects no page on the document reading tray, the judgement result in the step S116 is YES and a step S117 carries out a communication end process and the MPU 1 disconnects from the line. This step S117 is also carried out when the judgement result in the step S114 described above is NO.

The step S115 may be carried out in one of two ways. According to one method, the remaining pages of the document 33 may once be stored in the memory file 10 prior to transmission. As an alternative method, the remaining pages of the document 33 may be transmitted without being stored in the memory file 10, and in this case, the image data of the remaining pages are compressed in the compression/expansion part 5 and transmitted via the line and communication control unit 11 similarly as in the case of the normal transmission mode of the conventional facsimile machine.

As a modification of the embodiment, the step S4 may judge whether or not an available memory area remaining within the memory file 10 is insufficient to store another page of the document 33. In this case, when the judgement result in the step S5 is YES, the process advances to the step S10 directly as indicated by a phantom line in FIG. 3. As a result, the chain transmission mode is automatically selected when the memory file 10 is full in a state where one or more pages of the document 33 still remain to be transmitted.

Further, the present invention is not limited to these embodiments, but various variations and modifications may be made without departing from the scope of the present invention.

What is claimed is:

1. A facsimile transmission system included in a facsimile machine which has a store-and-forward mode in which image data related to one or a plurality of document pages set in a reading position are read by one reading means and temporarily stored in memory means and thereafter transmitted to a destination by transmitting means at an arbitrary time, said facsimile transmission system comprising:

detecting means for detecting a certain state where an empty memory area of the memory means available for storing the image data of the one or a plurality of document pages reaches a predetermined area, the one reading means, in response to the detecting of the certain state discontinues the reading of the one or a plurality of document pages;

alarm output means coupled to said detecting means for outputting an alarm when said detecting means detects the certain state and discontinues the reading, prompting a user to manually reset the one of a plurality of document pages set in the reading position;

instructing means for outputting an instruction generated by the user which instructs the transmitting means to transmit the image data of the one or a plurality of document pages which are temporarily stored in the memory means to the destination, and instructs a chain transmission mode in which the one or a plurality of document pages which have not been read are read by the one reading means and transmitted by the transmitting means in real time immediately after transmission of the image data of the one or a plurality of document pages stored in the memory means and without interruption, and without being stored in the memory means; and control means coupled to said alarm output means and said instructing means for controlling a mode of the facsimile machine to the chain transmission mode in response to the instruction when the alarm is output from said alarm output means.

2. The facsimile transmission system as claimed in claim 1, which further comprises one sensor means for detecting a document page set on the one reading means and timer means for timing a predetermined time from a time when said alarm output means outputs the alarm, said instructing means automatically outputting the instruction which instructs the chain transmission mode when said one sensor means detects the document page within the predetermined time timed by said timer means.

3. The facsimile transmission system as claimed in claim 1, wherein said predetermined area is zero.

4. The facsimile transmission system as claimed in claim 1, wherein said predetermined area of the memory means is less than a memory area required to store one document page.

5. The facsimile transmission system as claimed in claim 1, wherein said alarm output means includes at least one of a display for displaying the alarm and an alarm generator for generating an alarm sound.

6. A facsimile transmission system included in a facsimile machine which as a store-and-forward mode in which image data related to one or a plurality of document pages set in a reading position are read by one reading means and temporarily stored in memory means and thereafter transmitted to a destination by transmitting means at an arbitrary time, said facsimile transmission system comprising:

detecting means for detecting a certain state where an empty memory area of the memory means available for storing the image data of the one or a plurality of document pages reaches a predetermined area, the one reading means, in response to the detecting of the certain state discontinues the reading of the one or a plurality of document pages;

alarm output means coupled to said detecting means for outputting an alarm when said detecting means detects the certain state and discontinues the reading, prompting a user to manually reset the one or a plurality of document pages set in the reading position;

instructing means for outputting an instruction generated by the user which instructs the transmitting means to transmit the image data of the one or a plurality of document pages which are temporarily stored in the memory means to the destination, and instructs a chain transmission mode in which the one or a plurality of document pages which have not been read are read by the one reading means and transmitted by the transmitting means in real time immediately after transmission of the image data of the one or a plurality of document pages stored in the memory means and without interruption; and control means coupled to said alarm output means and said instructing means for controlling a mode of the facsimile machine to the chain transmission mode in response to the instruction when the alarm is output from said alarm output means;

said instructing means including at least a first key for starting a facsimile transmission when said first key is turned ON and a second key for designating the store-and-forward mode when said second key is turned ON, said instructing means outputting the instruction only when both said first and second keys are turned ON.

7. The facsimile transmission system as claimed in claim 1, which further comprises flag means coupled to said instructing means for storing the instruction output from said instructing means, said control means including means for controlling the one reading means to read the one or plurality of document pages after transmission of the one or plurality of document pages stored in the memory means depending on the instruction stored by said flag means.

8. A facsimile transmission system included in a facsimile machine which has a store-and-forward mode in which image data related to one or a plurality of document pages set in a reading position are read by one reading means and temporarily stored in memory means and thereafter transmitted to a destination by transmitting means at an arbitrary time, said facsimile transmission system comprising:

detecting means for detecting a certain state when an empty memory area of the memory means available for storing the image data of the one or a plurality of document pages reaches a predetermined area, the one reading means, in response to the detecting of the certain state discontinues the reading of the one or a plurality of document pages, enabling a user to manually reset the one or a plurality of document pages set in the reading position;

one sensor means for detecting a document page set on the one reading means;

instructing means coupled to said one sensor means for outputting an instruction generated by the user which instructs the transmitting means to transmit the image data of the one or a plurality of document pages which are temporarily stored in the memory means to the destination, and instructs a chain transmission mode in which the one or a plurality of document pages are read by the one reading means and transmitted in real time by the transmitting means immediately after transmission of the image data of the one or a plurality of document pages stored in the memory means and without interruption, and without being stored in the memory means, said instructing means automatically outputting the instruction when said one sensor means detects the document page set on the one reading means after the transmitting means transmits the image data of the one or a plurality of document pages stored in the memory means in the store-and-forward mode; and control means coupled to said instructing means for controlling a mode of the facsimile machine to the chain transmission mode in response to the instruction in the store-and-forward mode of the facsimile machine.

9. The facsimile transmission system as claimed in claim 8, wherein said predetermined area is zero.

10. The facsimile transmission system as claimed in claim 8, wherein said predetermined area of the memory means is less than a memory area required to store one document page.

11. The facsimile transmission system as claimed in claim 8, wherein said alarm output means includes at least one of a display for displaying the alarm and an alarm generator for generating an alarm sound.

12. A facsimile transmission system operable by a user, for transmitting image data of a document on a transmission line, comprising:

a document reader for reading the document and generating image data based on the document;

a memory unit coupled to the document reader and having a predetermined memory amount, for storing the image data received from the document reader;

a detector coupled to the memory unit, for generating a detection signal which indicates whether the image data stored in the memory unit exceeds the predetermined memory amount;

an alarm coupled to the detector, for generating an alarm indication based on the detection signal, which prompts a user to manually reset a portion of the document which has not been read as image data and stored in the memory unit;

an operation panel operable by the user, which allows the user to input an instruction during a predetermined time after the alarm indication, to transmit the image data stored in the memory unit on the transmission line, and to transmit image data generated by the document reader on the transmission line by reading the portion of the document in real-time immediately after the transmission of the image data stored in the memory unit; and a controller coupled to the operation panel, the document reader and the memory unit, for receiving the instruction and controlling the document reader and the memory unit to execute the instruction.

* * * * *